United States Patent [19]
Jones

[11] 4,119,796
[45] Oct. 10, 1978

[54] AUTOMATIC DATA SYNCHRONIZER
[75] Inventor: Emmett Lee Jones, Upper Marlboro, Md.
[73] Assignee: Versitron, Inc., Washington, D.C.
[21] Appl. No.: 737,653
[22] Filed: Nov. 1, 1976
[51] Int. Cl.² ............................................. H04L 7/08
[52] U.S. Cl. ..................................... 178/69.1; 328/56
[58] Field of Search ....................... 328/55, 56, 37, 63, 328/155; 178/53, 69.1; 307/221; 179/15 BS; 358/149

[56] References Cited
U.S. PATENT DOCUMENTS

| | | | |
|---|---|---|---|
| 3,758,711 | 9/1973 | Crosno | 358/149 |
| 3,883,810 | 5/1975 | Tacussel | 328/56 |
| 3,961,138 | 6/1976 | Fellinger | 178/69.1 |

Primary Examiner—Benedict V. Safourek
Attorney, Agent, or Firm—LeBlanc & Shur

[57] ABSTRACT

Disclosed is a device for automatically synchronizing incoming digital data with a local clock. Incoming clock pulses are compared with the local clock pulses after being delayed by a sufficient amount to produce synchronization between the incoming and local clock pulses. The incoming data pulses are delayed by the same amount as the incoming clock pulses so that they too are synchronized with the local clock. Both digital delays are variable and may be used to provide both fractional clock period delays or multiple clock period delays for accurate synchronization over a relatively long communications cycle.

20 Claims, 19 Drawing Figures

AUTOMATIC DATA SYNCHRONIZER

This invention relates to an automatic data synchronizer for synchronous data communications systems and more particularly is directed to a device for processing incoming data so as to synchronize incoming data to a local clock in both frequency and phase.

In modern synchronous data communications systems, a need exists to realign incoming data with local clock signals. The data misalignment may be a fixed-phase difference generally caused by propagation delays, or a constantly changing phase difference caused by frequency errors between sending and receiving clock signals, doppler shift of satellite signals or other perturbations of the transmission medium. These needs are for the most part currently being satisfied as follows. In the case of fixed-phase difference, manually adjusted phase shifters are generally employed. In the case of frequency error between clocks, accurate sources (in the order of $10^{-9}$ to $10^{-12}$) are employed to reduce the frequency error such that data may be communicated for relatively long periods of time before a phase shift of a magnitude to cause an error occurs, and in the case of satellites, devices known as elastic buffers are employed to introduce an initial delay in the received data which may be increased or decreased to compensate for the decrease or increase of the propagation delay (doppler) caused by the motion of the satellite. To summarize, the problem is keeping incoming data signals synchronized with local clock signals.

The present invention is directed to a device which solves the problem and which does not require manual adjustment. By processing incoming data so as to synchronize the incoming data with local clocks in both frequency and phase, it is possible to have data transmission for extended periods of time, or continuously under some circumstances, without requiring resynchronizing and the attendant loss of data and transmission time. Typically a communications center might receive multiple data signals from multiple locations, all of which may have fixed or varying phase differences with respect to the local clock. The system of the present invention synchronizes all such data signals with the local clock for either local processing or composite retransmission to another communications center. This synchronization of the data is accomplished automatically and without introducing any error.

The synchronizer consists of two basic parts namely an automatic data phaser which compensates for phase differences up to 1-bit length of data, and an elastic buffer which compensates for many bits of data drift caused by a constantly changing phase difference. That is, phase differences greater than 360° are compensated by the elastic buffer, while the data phaser compensates for phase differences less than 360°. This is done by comparing a clock derived from the incoming data to the local clock in order to determine the amount of delay to be added to or removed from the incoming data in order to align it with the local clock. The system is started with 50 percent of the available introduced (centered). If the incoming data is slightly faster than the local clock, the delay is increased appropriately. Conversely, if the incoming data is slower than the local clock, the delay is decreased. If the data speed error is caused by a difference in send and receive clocks, the delay will ultimately either increase to 100 percent or decrease to zero percent. In either case the synchronizer will automatically recenter causing a break in communication. However, the operating time is extended by this process by a factor equal to the number of bits in the elastic buffer. The size of the elastic buffer can be made to match the normal cycle time of the communications resynchronization and therefore essentially continuous operation is achieved. If the data drift is cyclical as is the case with satellites, the elastic buffer may be made large enough to accommodate the total data drift up to the point where the drift direction reverses and continuous operation is achieved.

The phaser operates as follows. An oscillator is phase locked at typically four times the data derived clock speed. The data derived clock is applied to a four bit shift register which is clocked by the oscillator. The outputs of the shift register are the data derived clock delayed by $\frac{1}{4}$, $\frac{1}{2}$, $\frac{3}{4}$ and one clock period. A four-input data selector is connected to this shift register's outputs such that the data selector output is selectively connected to one of the shift register parallel outputs. The data selector output and the local clock are compared in a phase detector. The phase detector output controls an up/down counter which increases or decreases its count. The up/down counter status selects the appropriate output of the data selector such that the delayed data derived clock transmissions are within ± 25 percent of the local clock transitions.

The incoming data is applied to a second shift register—data selector combination with parallel inputs. The data is delayed by the same amount as the data derived clock. The data transitions occur within ± 25 percent of one polarity of the local clock transitions which by way of example only may be positive going. The other clock transitions, negative going in this case, occurs within ± 25 percent of the mid point of the data bit and is used to clock the data out. In this way the data and clock are synchronized and all phase differences and jitter removed. The up/down counter has a many bits capacity and the first two are used to control the phaser delay to the nearest one fourth bit. The higher order bits are used to control the elastic buffer.

The elastic buffer is a long shift register with a correspondingly large data selector connected to each bit of the shift reguster such that the data selector output may be connected to any one of the shift register parallel outputs depending on the state of the data selector control inputs. The received data is applied to the shift register input and the shift register is clocked by the data derived clock. The data selector output is the data delayed by one bit increments. The maximum delay in bits is the number of stages in the shift register. The buffer is controlled by the up/down counter on the phaser such that each time the phaser makes four one-fourth bit corrections the elastic buffer makes a one bit correction. There is no inherent system limitation of the capacity of the elastic buffer.

It is therefore one object of the present invention to provide a device for synchronizing incoming data with a local clock.

Another object of the present invention is to provide an automatic data synchronizer which synchronizes data continuously without causing any error.

Another object of the present invention is to provide an automatic data phaser for correctly phasing incoming data with a local clock.

Another object of the present invention is to provide an automatic data synchronizer with no inherent limitation on the phase difference that can be tolerated.

Another object of this invention is to provide an automatic synchronizer which sychronizes data by comparing incoming and local clocks.

Another object of the invention is to provide a data synchronizer including a modular type elastic buffer which may be expanded in capacity as needed.

Another object of the invention is to provide a data synchronizer which imposes no constraints on the data stream.

These and further objects and advantages of the invention will be more apparent upon reference to the following specification, claims and appended drawings wherein:

FIGS. 7a through 7h taken together constitute a detailed block diagram of the data phaser; and FIGS. 8a through 8e taken together constitute a detailed block diagram of the elastic buffer used in conjunction with the data phaser to form the synchronizer.

Figure 1:
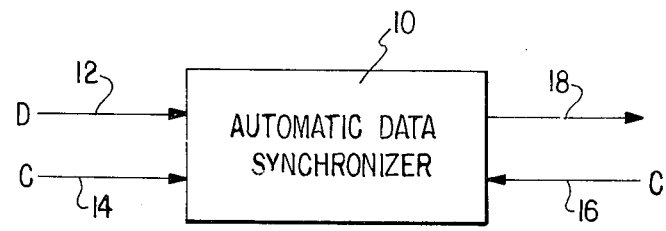
FIG. 1 is a diagram illustrating the clock comparison synchronizing system of this invention.

Referring to the drawings, the automatic data synchronizer of the present invention is shown by the large box 10 in FIG. 1. The synchronizer is shown as receiving incoming data over a line 12 and an incoming clock signal over a line 14. It is understood that the clock signal on line 14 may be derived from the data on line 12, depending upon the type of system involved, but a separate clock line 14 is illustrated in FIG. 1 for the sake of clarity. A third signal is applied to the synchronizer by way of a line 16 and this third signal is the local clock. Data leaves the synchronizer by way of a line 18 synchronized with the local clock signal on lead 16. The synchronizer 10 compares the incoming clock on lead 14 with the local clock on lead 16 and acts as a variable delay line so as to change the amount by which the outgoing data on lead 18 is delayed in relation to the incoming data on lead 12 in accordance with the phase difference between the clock signals on leads 14 and 16. The change in delay is made digitally and without introducing errors in the system.

Figure 2:
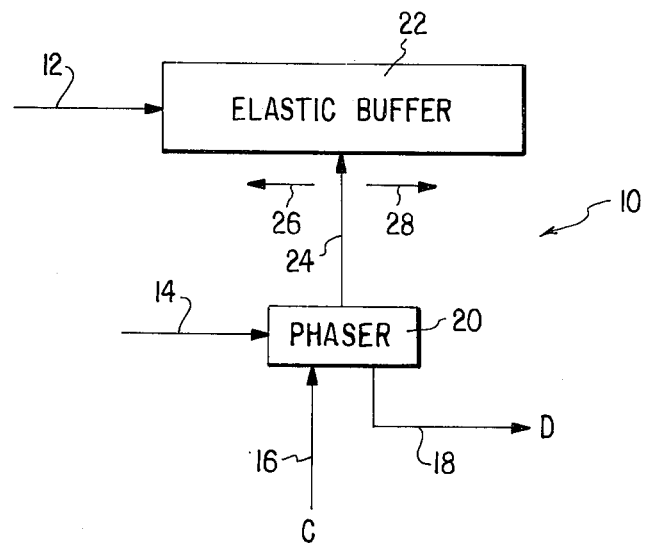
FIG. 2 shows the relationship between the phaser and elastic buffer of the synchronizer.

FIG. 2 is a slightly more detailed showing of the synchronizer with like parts bearing like reference numerals. As can be seen from FIG. 2, the synchronizer comprises a phaser 20 electrically coupled to an elastic buffer 22. Phaser 20 acts as a variable delay for introducing delay in digital increments to produce a total delay in the data of up to one full data period. The elastic buffer 22 cooperates with the phaser to introduce larger delays, that is, delays of more than one bit period. The system is initially set up so that the data is delayed by a number of bit periods corresponding to one-half the storage capacity of the buffer as indicated by the arrow 24 positioned at the center of the buffer. The delay is then increased or decreased as indicated by the laterally extending arrows 26 and 28 in accordance with the comparison between the phase of the two clocks. Partial bit corrections are made by the phaser and whole bit corrections are made by the elastic buffer.

Figure 3:
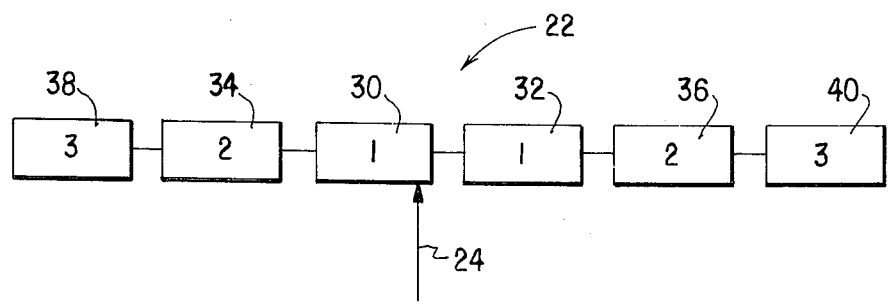
FIG. 3 illustrates the modular nature of the elastic buffer.

FIG. 3 illustrates the modular nature of the elastic buffer 22. The buffer may be initially formed by two storage boards or counting boards 30 and 32. These boards are both labelled "1". Additional capacity may be added later by adding the additional boards 34 and 36 both labelled "2". Further capacity is illustrated by the added boards 38 and 40 both labelled "3". In each case, an equal amount of capacity is added to both ends of the buffer to preserve symmetry and to allow for the same amount of delay change in either direction.

Figure 4:
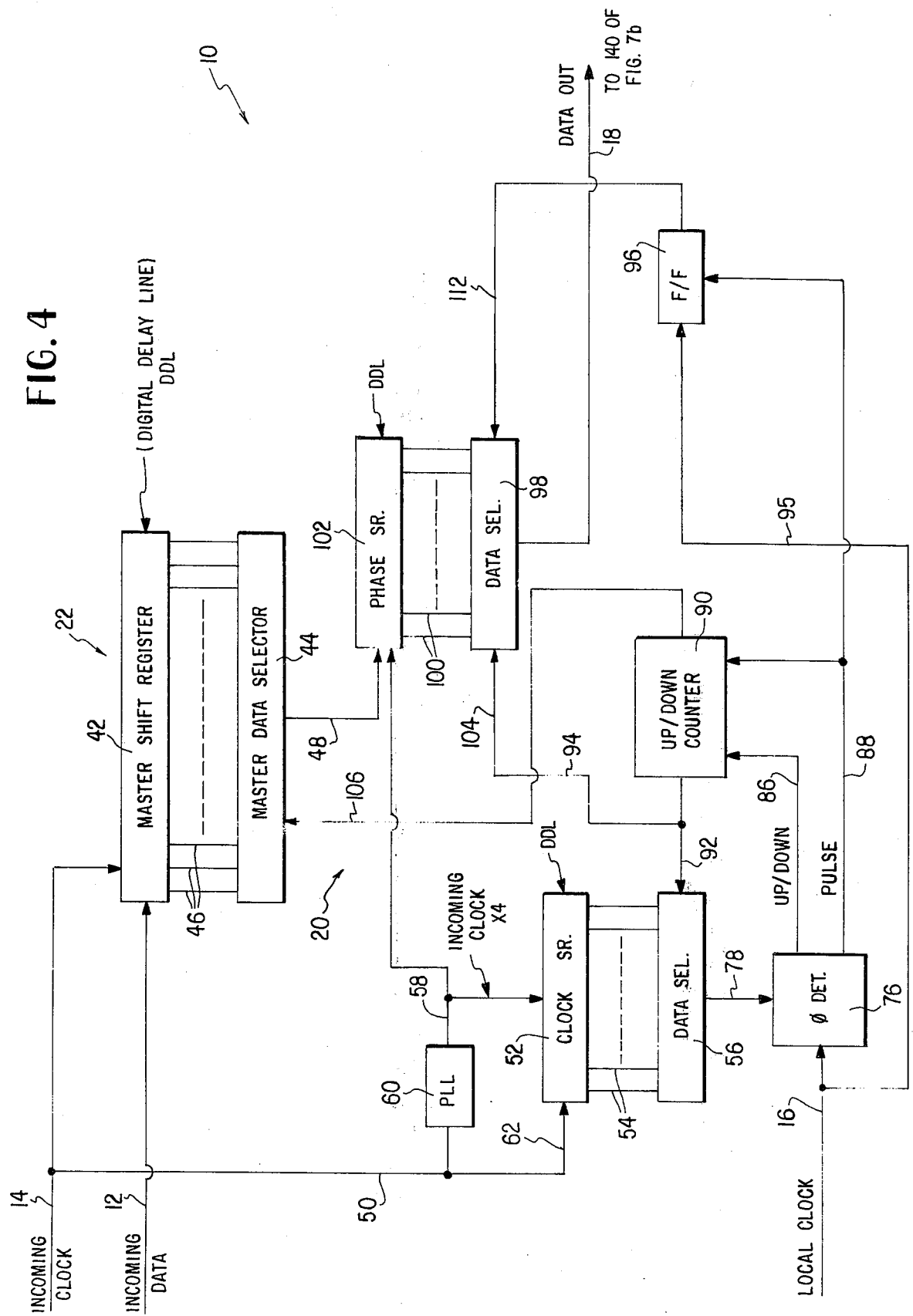
FIG. 4 is a simplified block diagram of the automatic data synchronizer of this invention.

FIG. 4 is a more detailed block diagram of the data synchronizer 10 again with like parts bearing like reference numerals. The elastic buffer is shown in FIG. 4 as comprising a master shift register 42 and a master data selector 44 to which the incoming data and clock are applied. Shift register 42 is preferably in the form of a binary counting chain which acts as a digital delay line. The master data selector 44 is simply a selector switch for selecting one of the parallel outputs 46 of the shift register 42 and applying it by way of a lead 48 to the data phase selector indicated at 102 in FIG. 4 and forming part of the data phaser generally indicated at 20.

Figure 5:
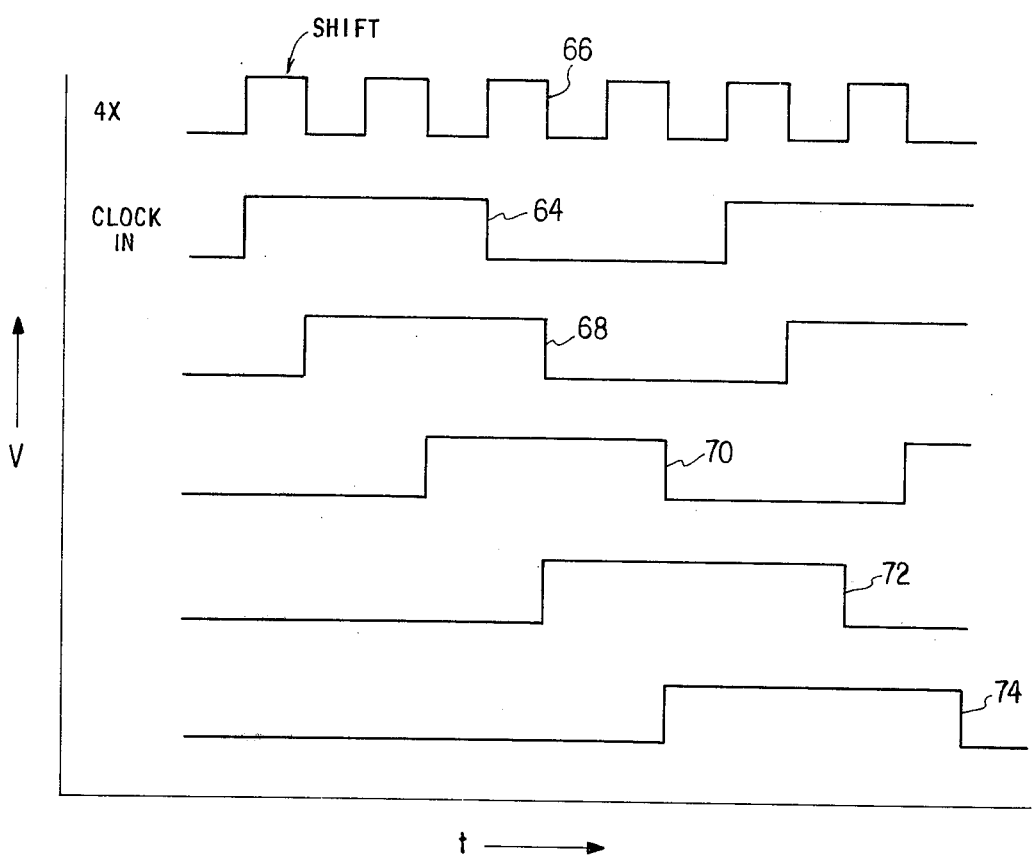
FIG. 5 are wave forms used in explanation of the system of FIG. 4.

The incoming clock signals are also applied by way of a lead 50 to the phaser 20 which comprises a clock shift register 52 with its parallel outputs 54 in a similar manner connected to a clock selector or phaser selector 56. The incoming clock signals are applied to the shift register 52 directly and by a lead 58 through a phase lock loop 60. The incoming clock signals are multiplied by four in the phase lock loop circuit and the multiplied pulses on the output lead 58 are used to shift the clock pulses themselves appearing on lead 62. The effect of this is illustrated in FIG. 5 which is a series of wave forms showing the clock signals on lead 62, the multiplied signals on lead 58, and the delayed clock signals on four consecutive outputs 54 of the shift register 52. The clock signal is shown in FIG. 5 at 64 and the multiplied output wave form from the phase lock loop 60 is shown at 66. The output from the first stage of the shift register 52 delayed by one-fourth bit is illustrated at 68 and the outputs from the next three stages each delayed an additional one-quarter bit are illustrated at 70, 72 and 74, respectively in FIG. 5.

Figure 6:
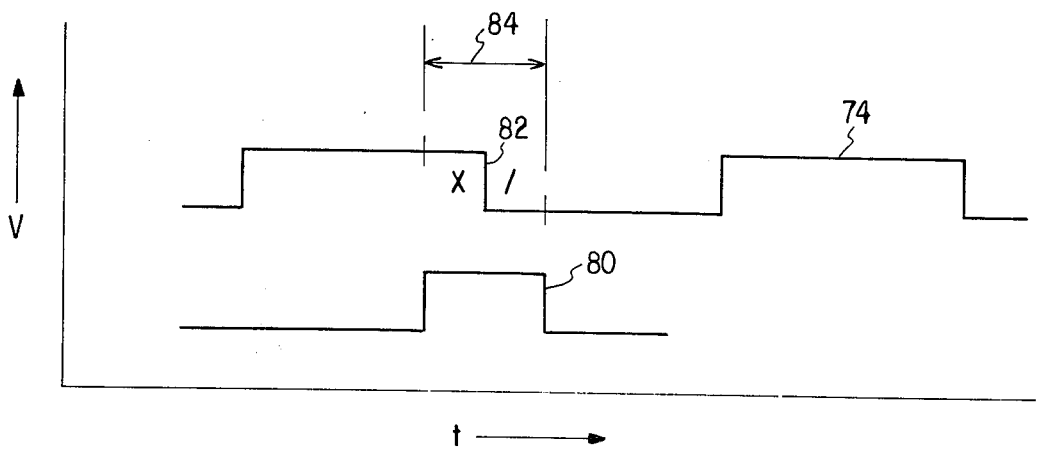
FIG. 6 shows wave forms for the comparison window in the data phaser.

The local clock signals on lead 16 which ideally are identical in frequency and phase to the incoming clock signals but which may differ over a period of time are applied to a phase detector 76 in FIG. 4. The phase detector breaks down the local clock signal into eight segments, and produces a pulse over a period of two of those segments around a transition of the local clock pulse and this is then compared with the incoming clock suitably delayed as it appears on lead 78 in FIG. 4. The phase detector 76 in effect generates a "window" for one-quarter of a clock period centered around a clock pulse transition and this window is compared with a transition of the delayed incoming clock pulse. This is illustrated in FIG. 6 where the delayed incoming clock pulse, for example, wave form 74, selected by selector switch 76 is compared with a one-fourth bit pulse 80 centered about negative going clock transition 82. If the negative going transition 82 coincides with any portion of the "window" pulse 80, i.e., is within the limits defined by the time 84, phase detector 76 in FIG. 4 produces an output. However, if the negative transition 82 moves inside the ± one-eighth bit window 84, output pulses from the phase detector 76 appear on respective lines 86 and 88. The output pulse on lead 88 is a counting pulse and this is applied to a data select control 90 preferably in the form of an up/down counter. An up/down signal appears on lead 86 with either a positive or negative polarity to indicate whether the counter 90 should count up or down. This is determined by whether the transition 82 in FIG. 6 occurs before or after the window pulse 80. Data select control 90 causes the data select switch 56 to move one stage along digital delay line 52 either to the right or left so as to select a suitably delayed incoming clock pulse such that the negative transition of the selected delay pulse again falls within the window 84 of FIG. 6.

The data select control signal on lead 92 from control 90 is also applied by way of a lead 94 to a data selector 98 in all respects identical to the data select switch 56 so that in effect the two selector switches 56 and 98 are ganged together. Switch 98 controls which one of the outputs 100 of digital delay or phase shifter 102 appears on the digital output line 18. In this way the data from the buffer 22 on lead 48 is delayed by exactly the same amount as the clock on lead 62.

A signal is supplied from the up/down counter 90 to the other data selector 98 by way of a lead 104 and to the master data selector 44 by a lead 106. The local clock is applied not only to the phase detector 76 but also by way of a lead 95 to a flip-flop 96, also receiving a signal from the phase detector on lead 88. Flip-flop 96 supplies an important control signal over lead 112 to data selector 98 for a purpose more fully described below.

While only a single up/down counter 90 is shown in FIG. 4, there are as described below three up/down counters in the overall data synchronizer, each having four bits. The first two bits of the up/down counter control both data selectors 56 and 98 in parallel. The higher order bits of the counter control the master buffer data selector 44. The first two bits control the ¼ data bit delays of the phaser 20 and the remaining bits control the master shift register 42 in one data bit delay increments.

FIGS. 7a through 7h arranged in accordance with FIG. 7 constitute a detailed block diagram or logic diagram of the phaser 20. The phaser 20 as illustrated in FIG. 7 is a stand alone unit which may be used either by itself to produce phase adjustments of up to one whole bit or it may be connected to the elastic buffer 22 shown in detail in FIGS. 8a through 8e to form a complete multi-bit data synchronizer. The preferred embodiment of the synchronizer is formed completely from CMOS.

Figure 7A:
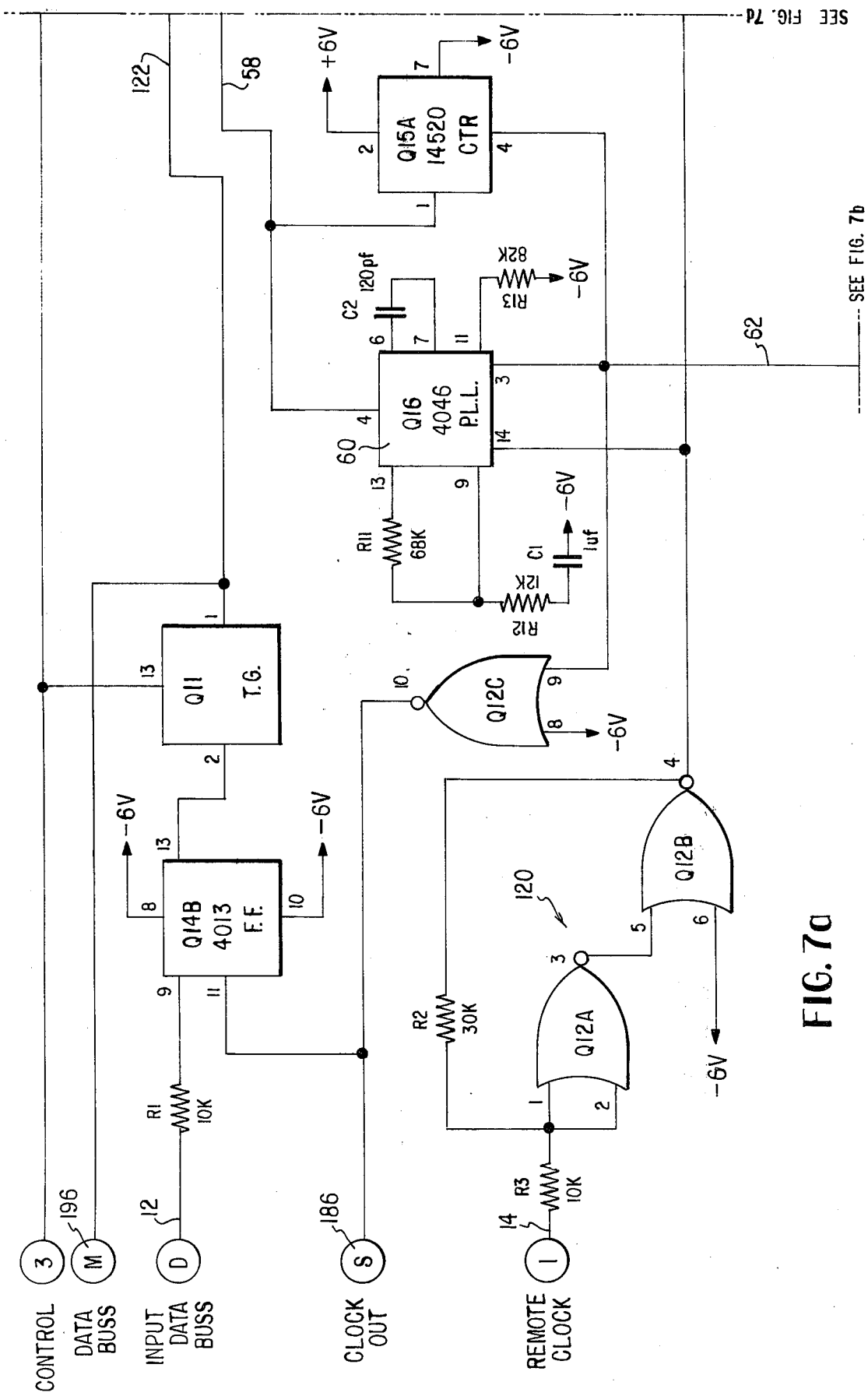
Figure 7B:
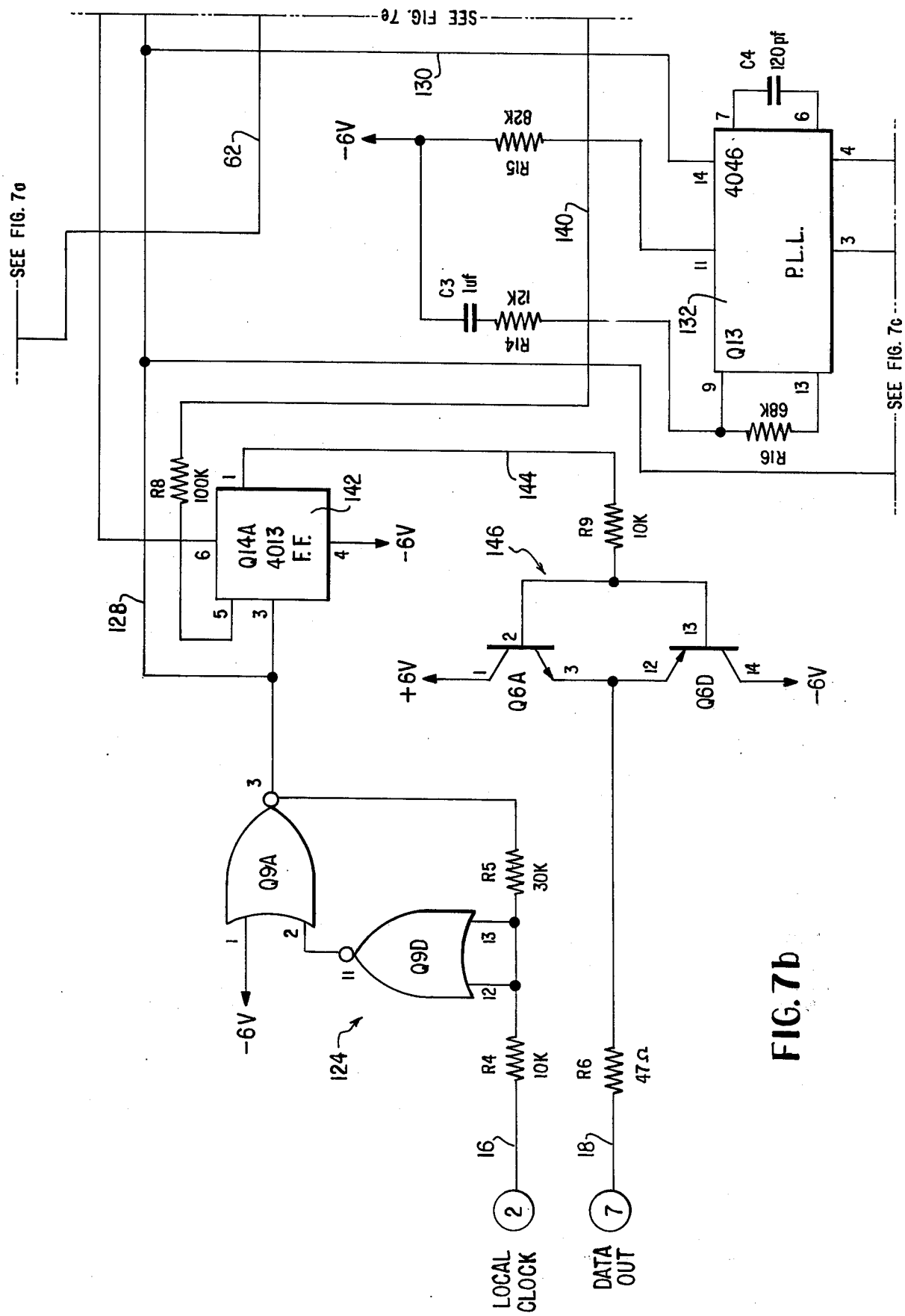
Figure 7C:
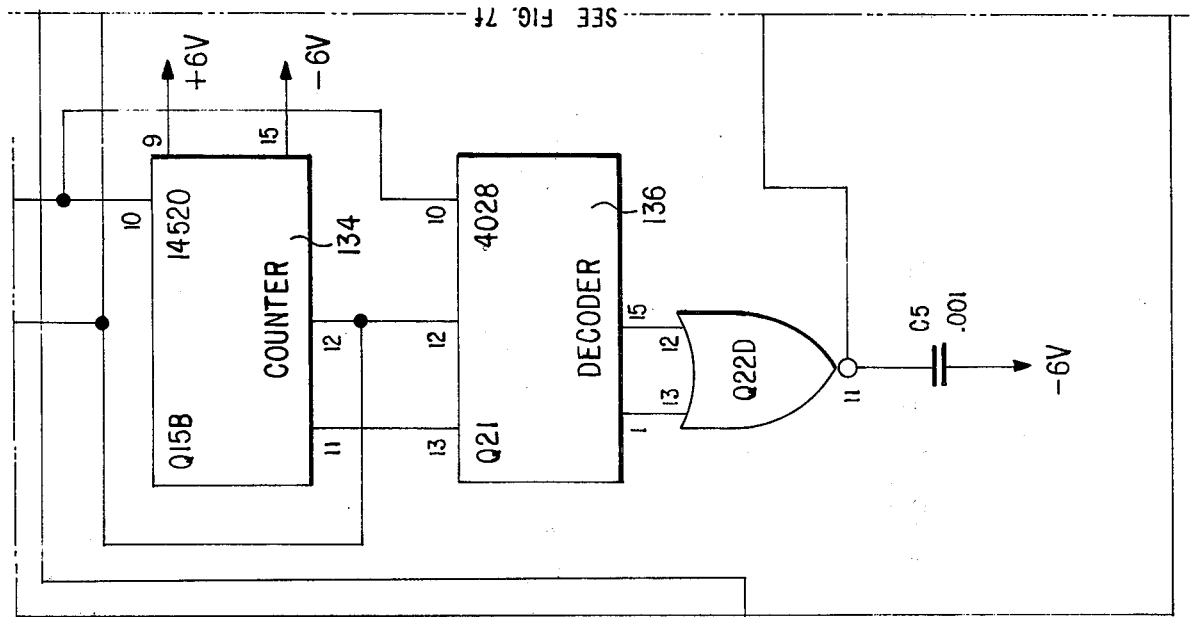
Figure 7C:
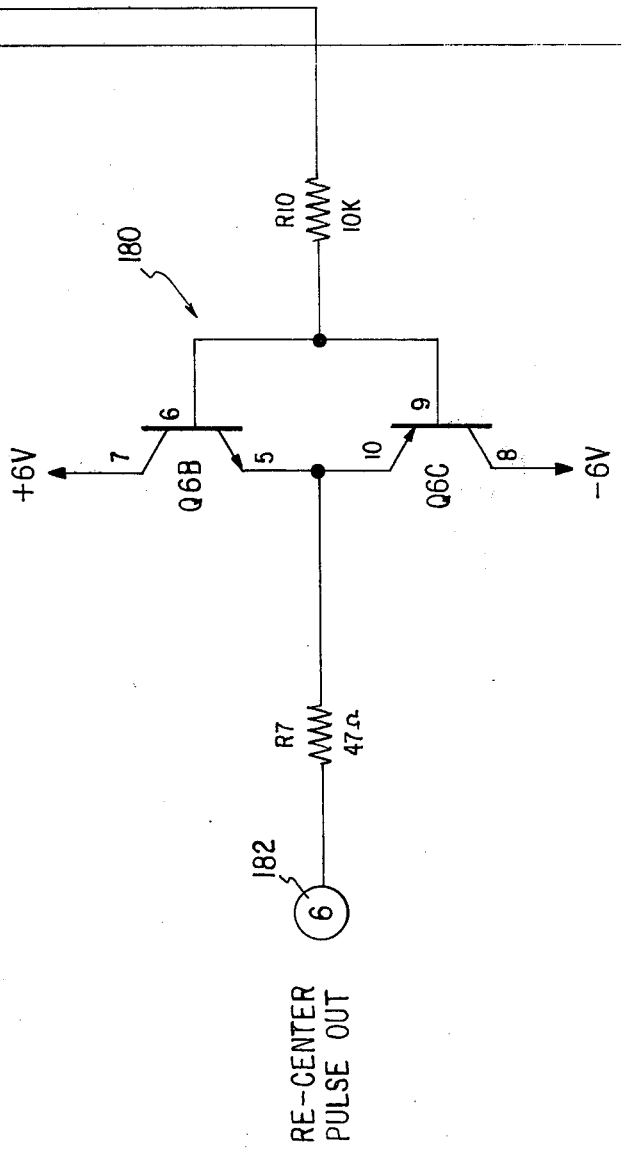
Figure 7D:
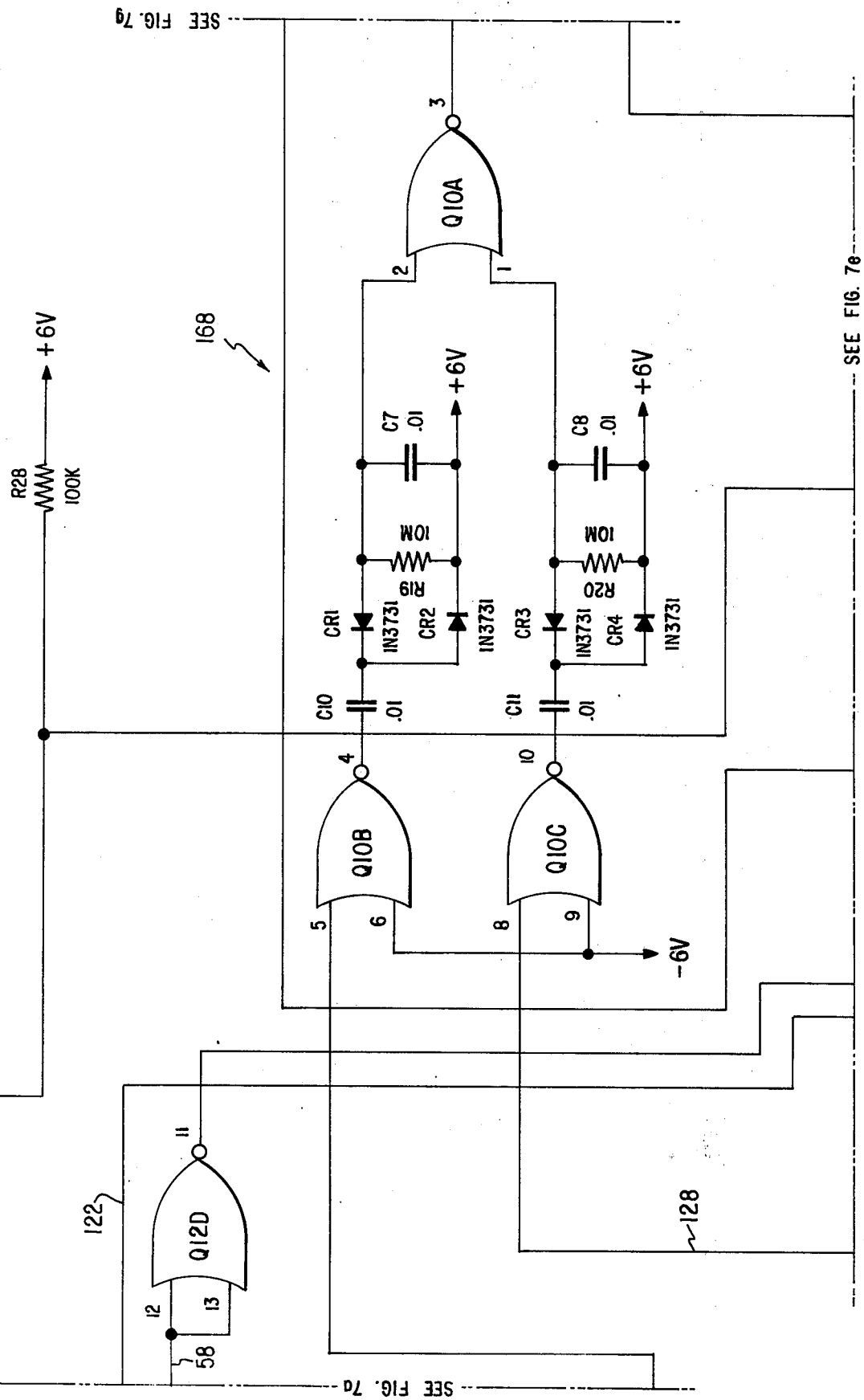
Figure 7E:
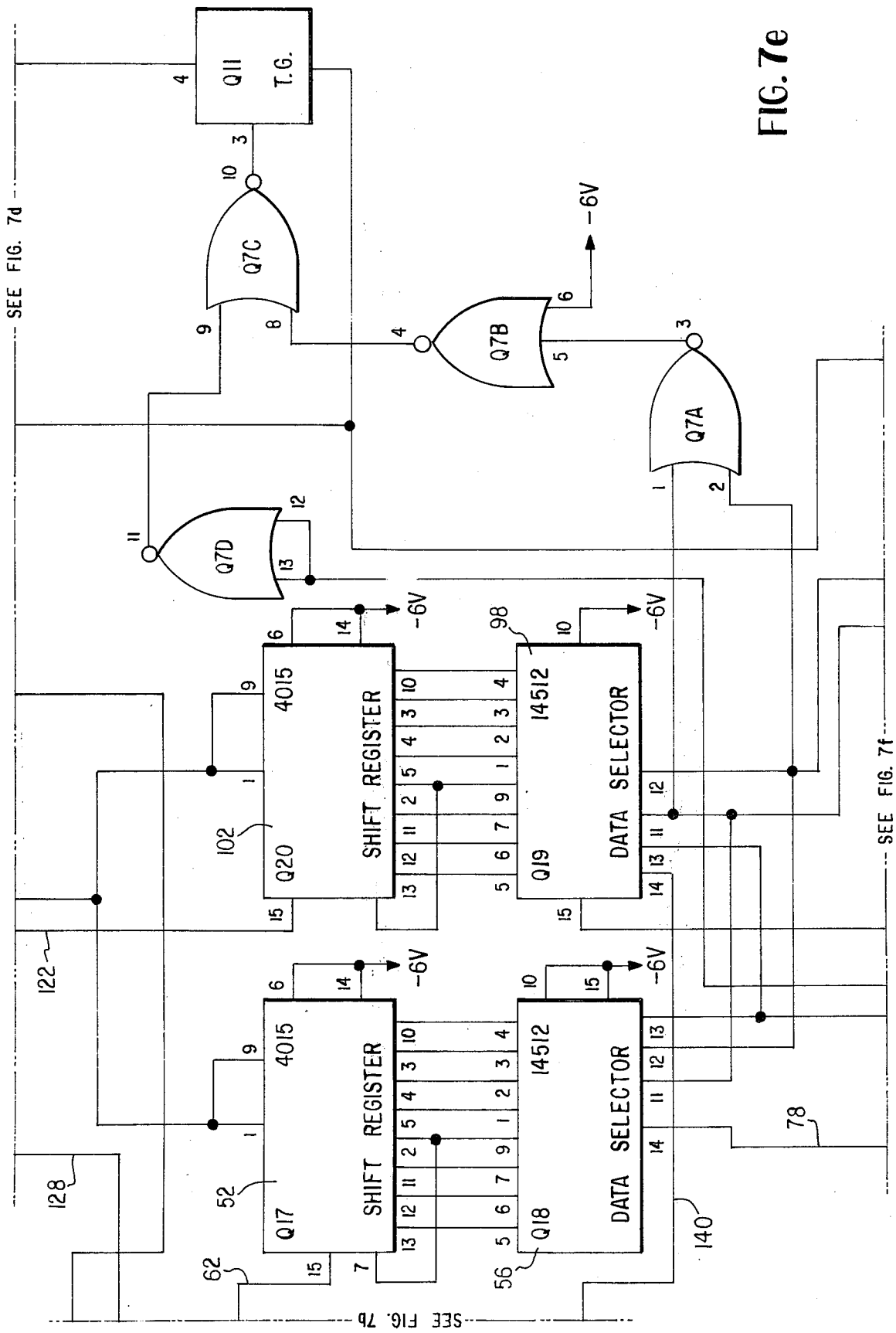
Figure 7F:
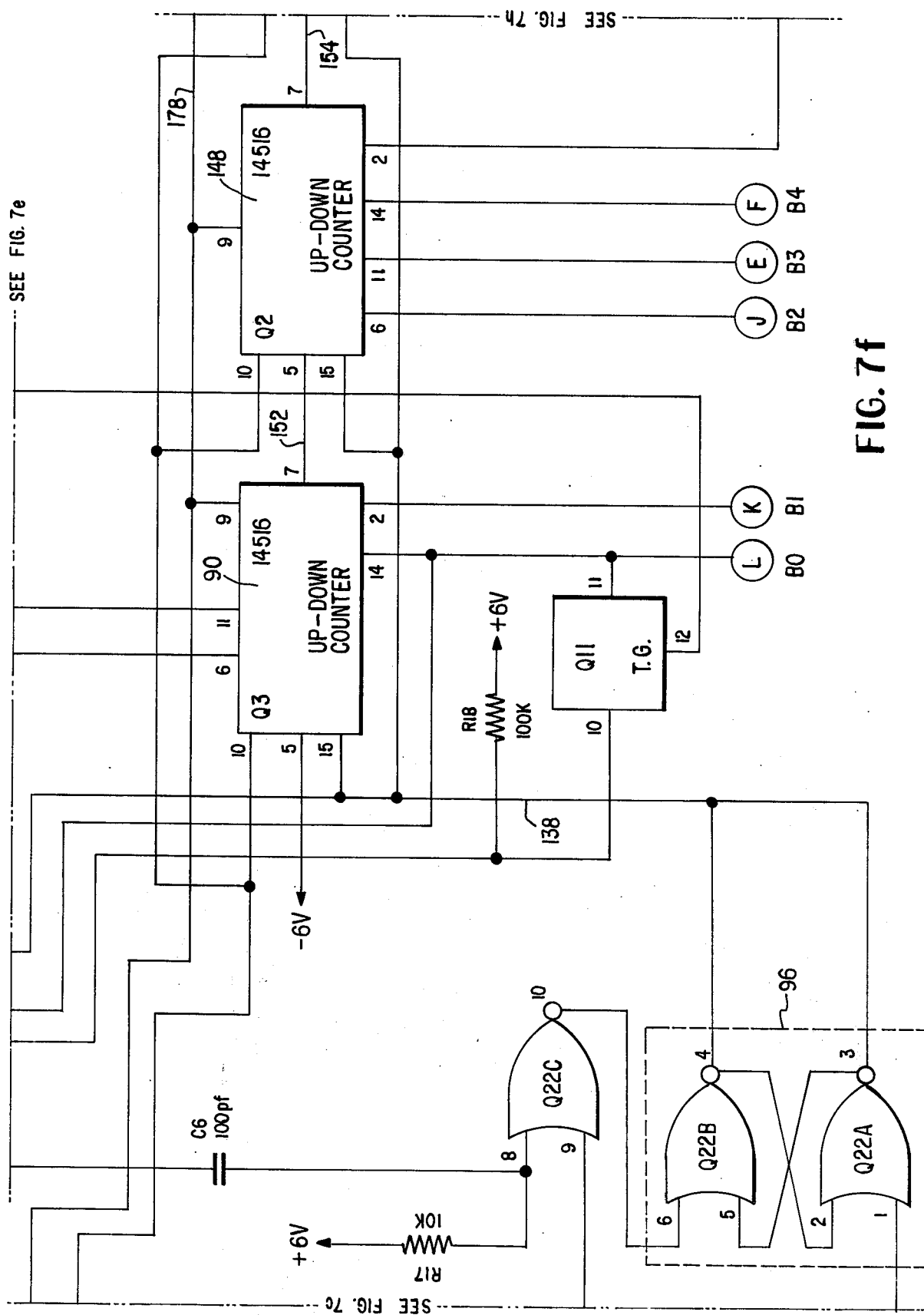
Figure 7G:
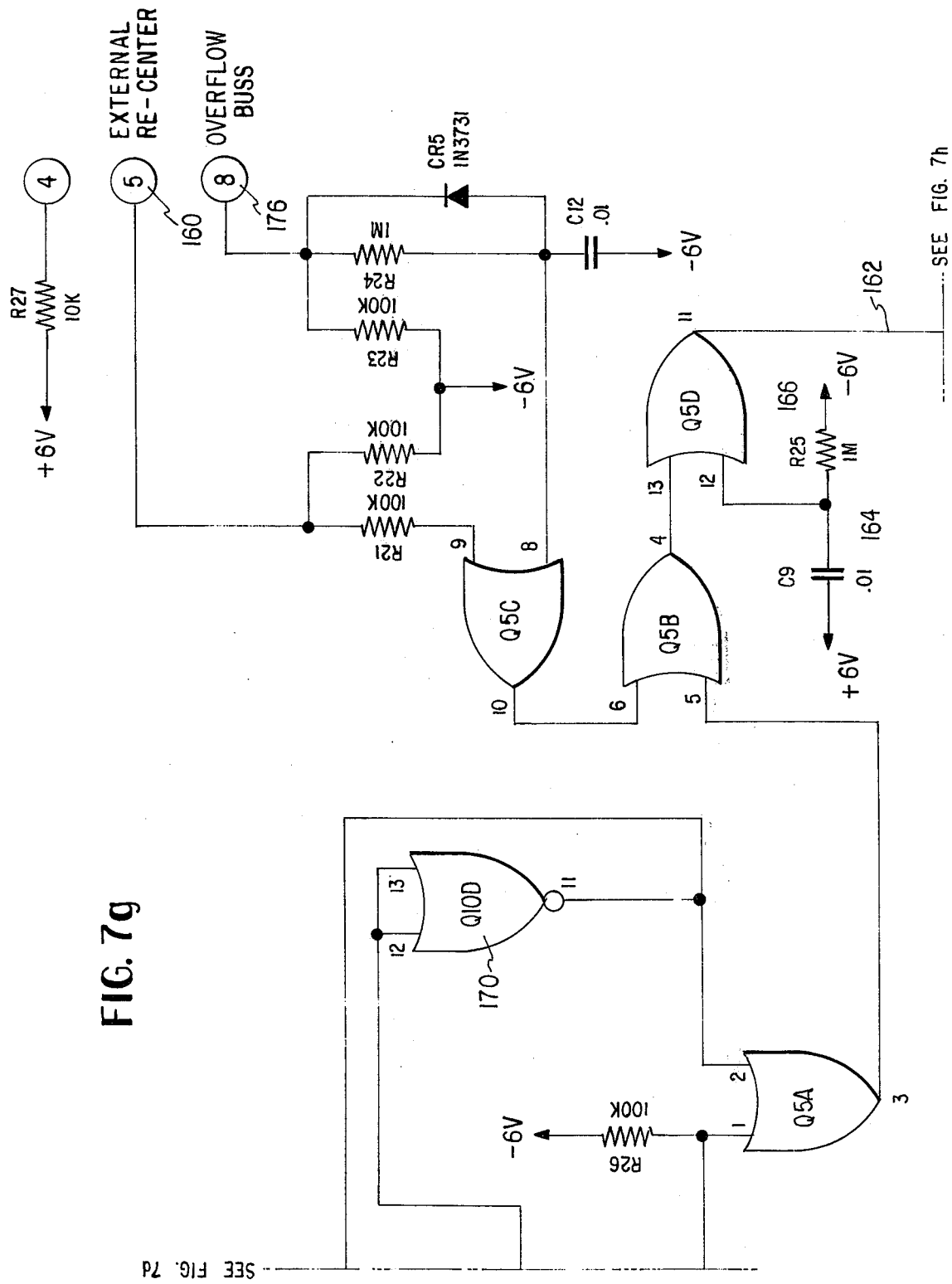
Figure 7H:
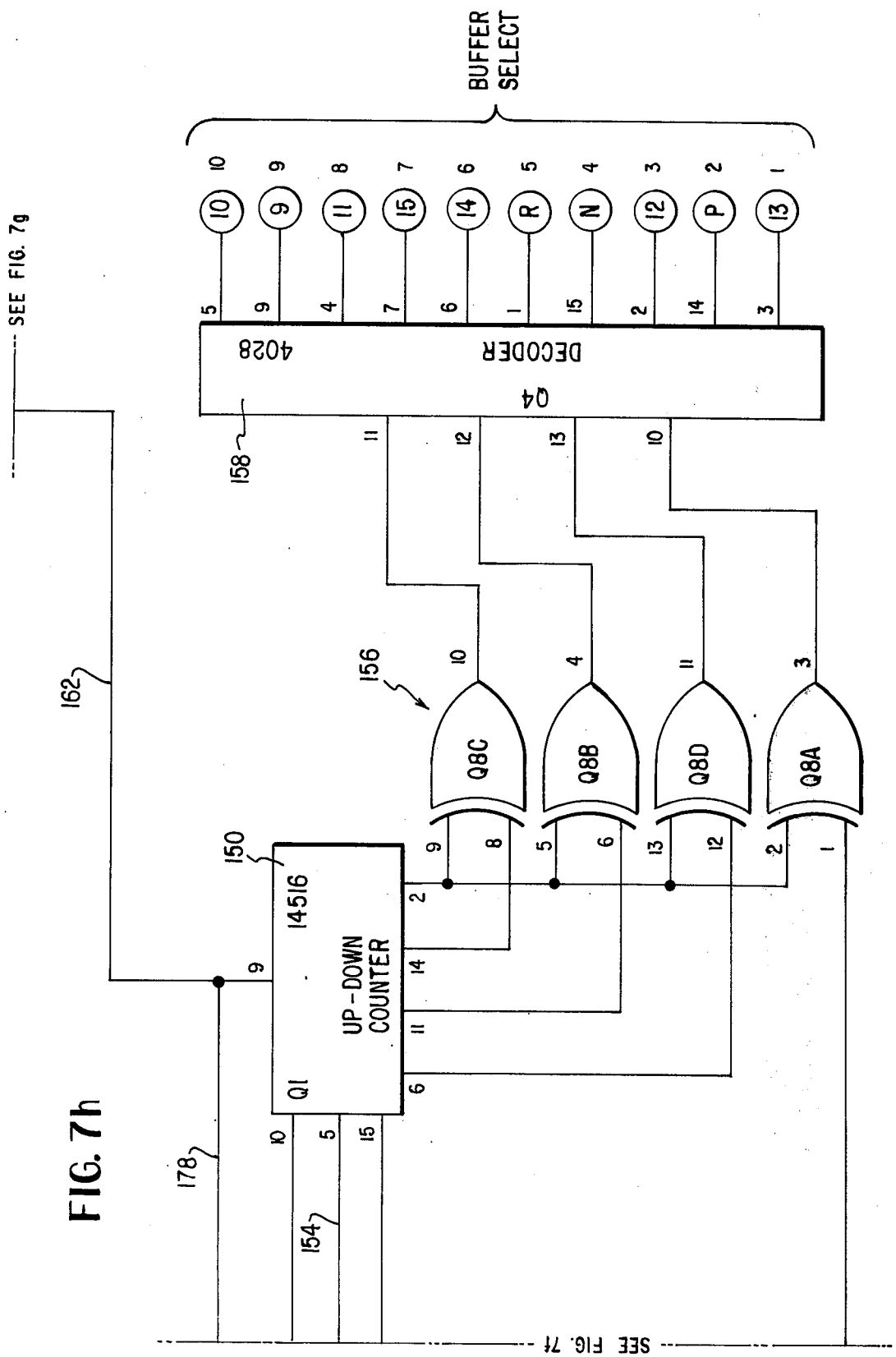
Figure 8A:
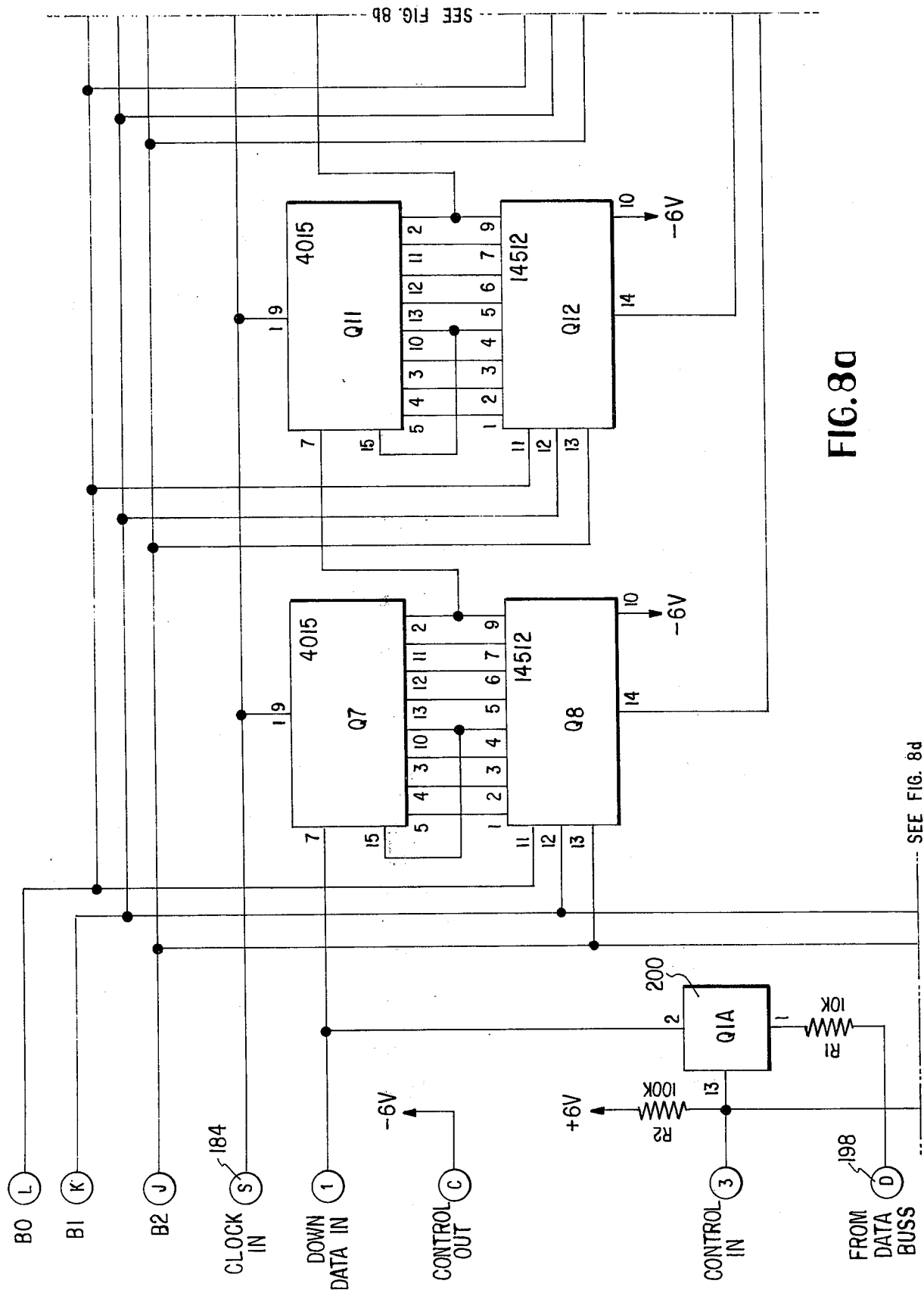
Figure 8B:
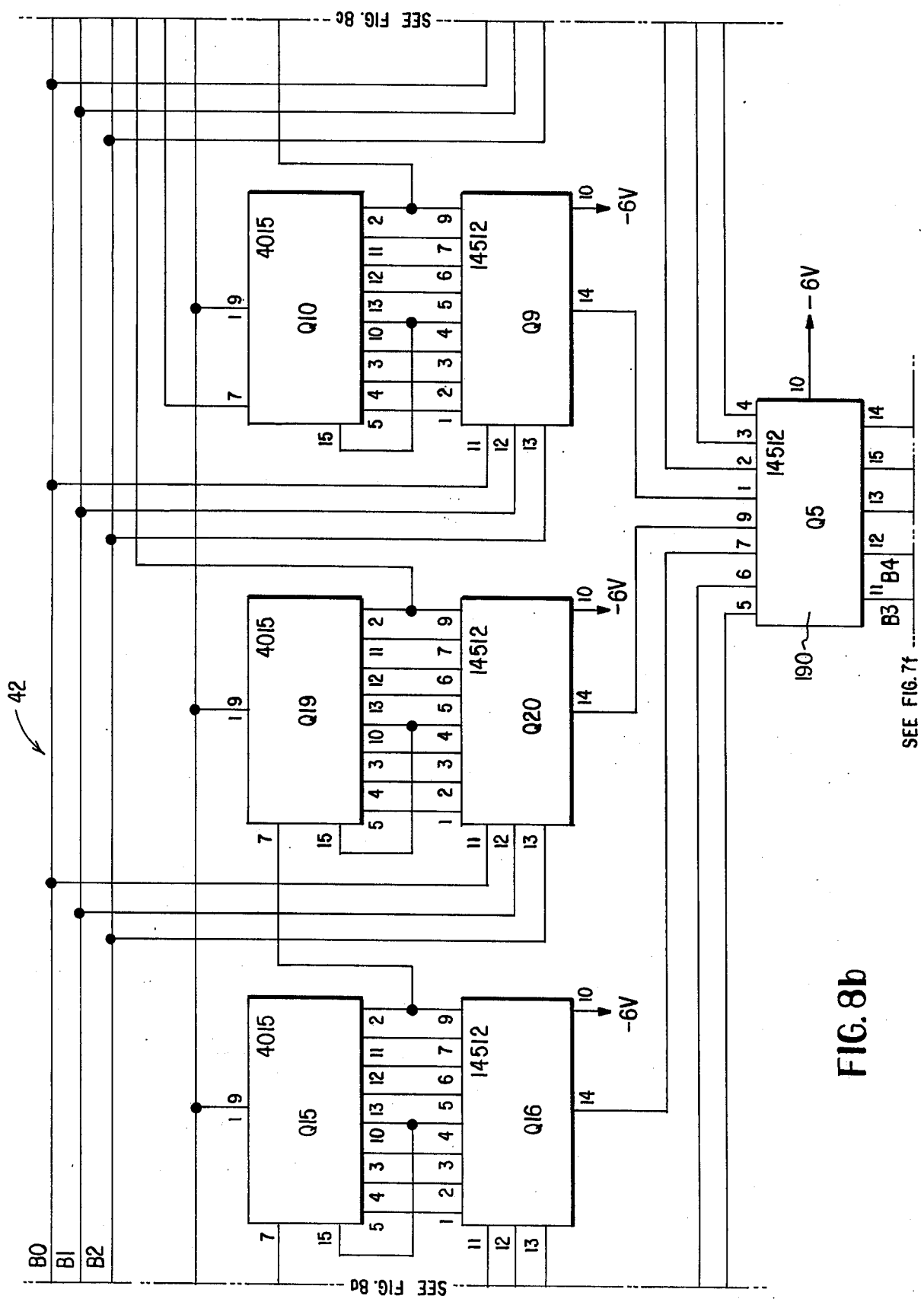
Figure 8C:
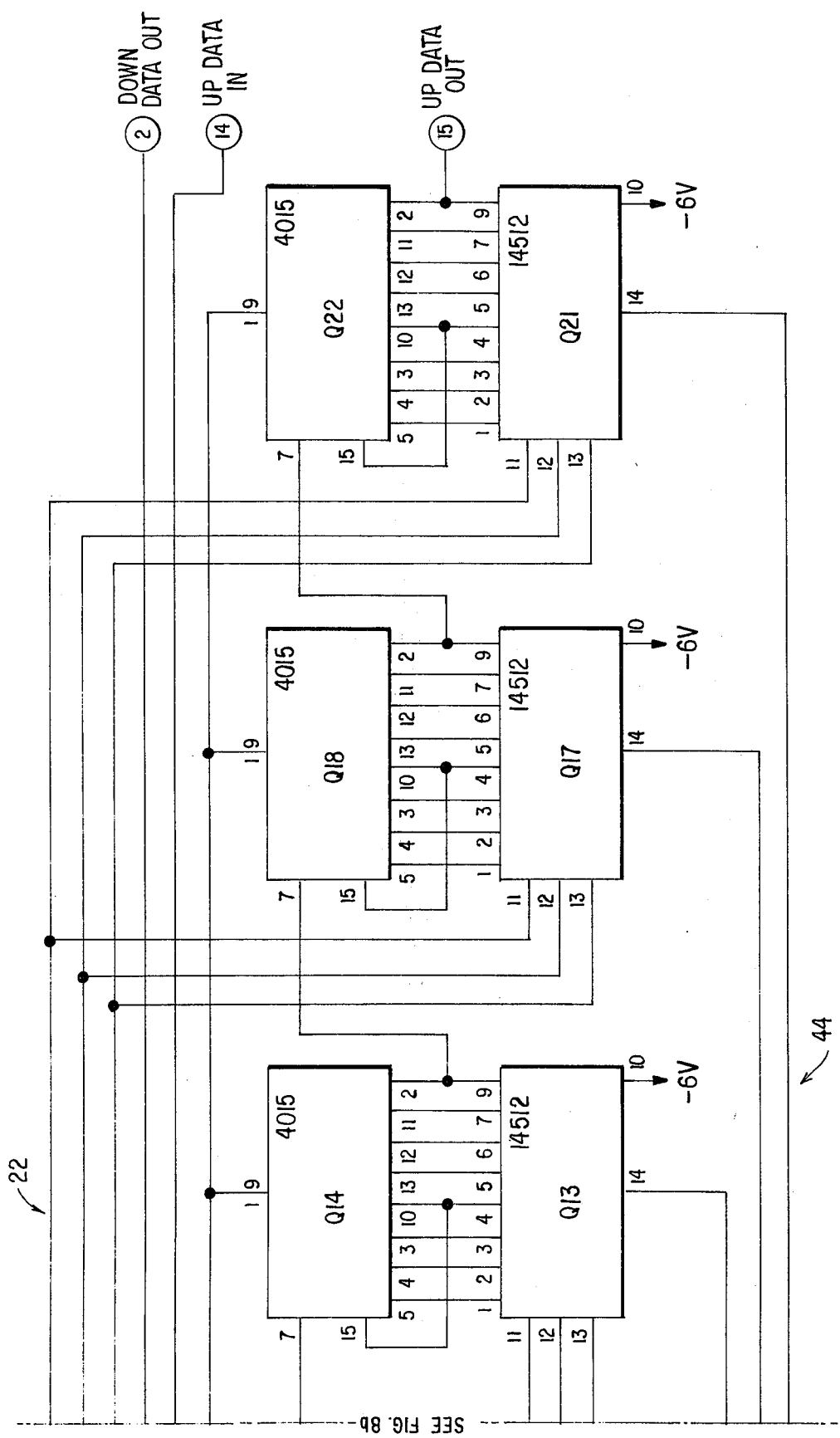
Figure 8D:
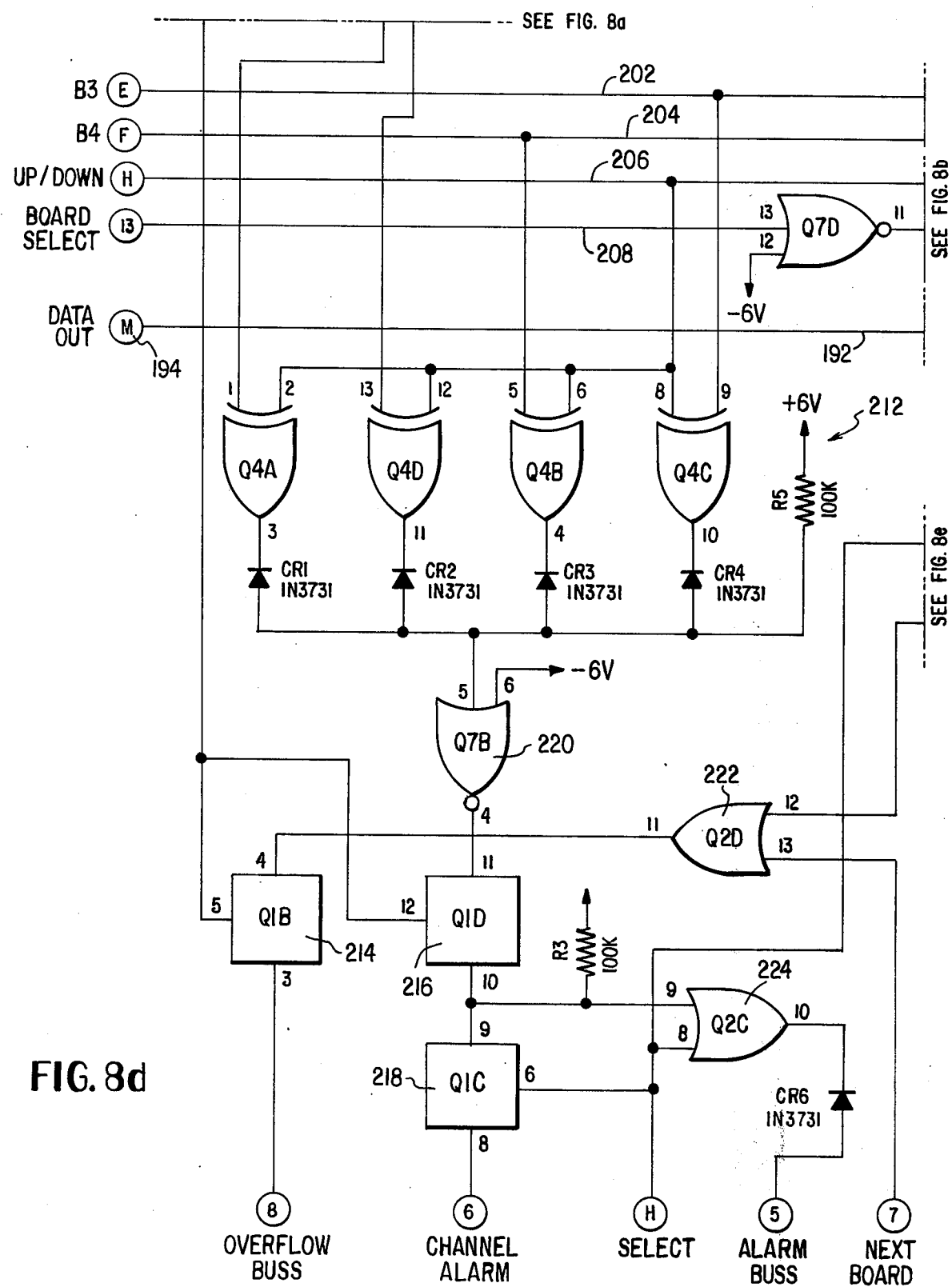
Figure 8E:
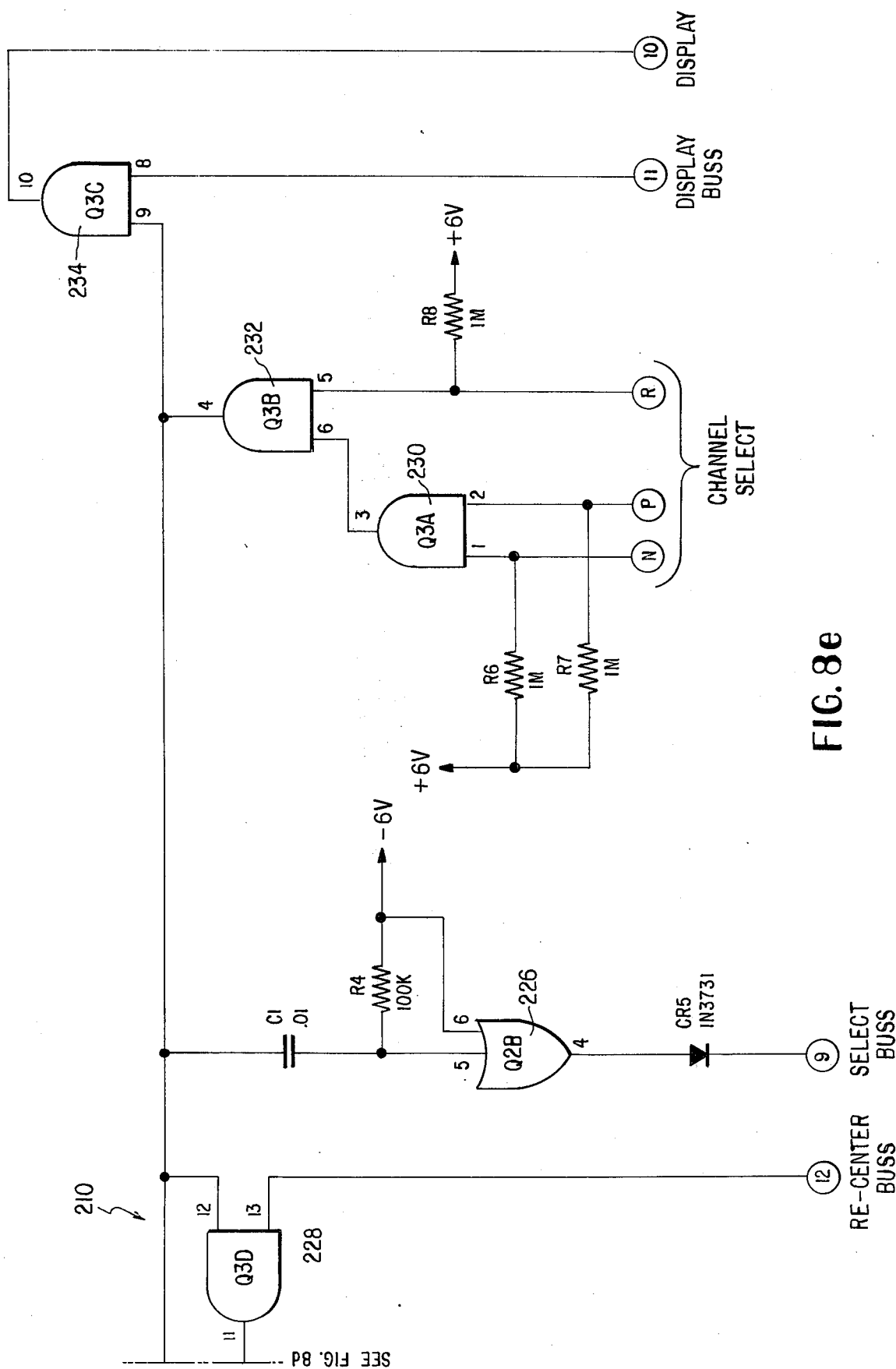

In FIG. 7a, the remote clock input at the terminal labelled 1 passes by way of lead 14 to a Schmitt trigger 120 formed by gates Q12A and Q12B. The Schmitt trigger acts as a squaring filter and noise protector. From the Schmitt trigger the remote clock signals pass to the phase lock loop 60 (Q16) where they are multiplied by four to appear at four times the frequency on lead 58. These are applied through gate Q12D to the shift registers 52 and 102 at terminals 1 and 9. Clock pulses from the phase lock loop are applied by way of lead 62 to terminal 15 of shift register 52 (Q17). Data from the input data bus terminal D passes by way of lead 12, flip-flop Q14B and transmission gate Q11 by way of a lead 122 to terminal 15 of shift register 102 (Q20).

Local clock signals are applied to terminal 2 and pass over lead 16 to a similar Schmitt trigger 124 comprising gates Q9A and Q9D. The squared output passes over leads 128 and 130 to input pin 14 of a second phase lock loop 132 (Q13). From this phase lock loop the local clock signals are applied to the phase detector 76 comprising a divide by four counter 134 (Q15B), a decoder 136 (Q21), and gates Q22A, Q22B, Q22C, and Q22D. Counter 134 divides the multiplied signal by four and decoder 136 makes eight periods. The logic gates pick up two of these periods, one before and one after the clock transition and create the window previously described and illustrated in conjunction with FIG. 6. The phase detector or phase comparator produces an output count on a lead 138 which is applied as an input to pin 15 of the up/down counter 90 (Q3). The up/down input to counter 90 is applied to pin 10 of the counter from the phase detector or phase comparator 76. Delayed data from data selector 98 (Q19) appears as an output at pin 14 and is supplied by way of a lead 140 to a D-type flip-flop 142 (Q14A). This flip-flop acts as a regenerator and supplies an output signal by way of a lead 144 and a line driver 146 to the data output terminal 7 by way of lead 18.

The additional up/down counters 148 and 150 (Q2 and Q1) are for handling larger numbers and are used with the elastic buffer of FIG. 8 as more fully described below. The up/down counters are interconnected at respective pins 5 and 7 by the "carry" leads 152 and 154. Count outputs appear at pins 2, 6, 11, and 14 of the up/down counters. An up/down count control circuit 156 is formed by exclusive OR gates Q8A, Q8B, Q8C, and Q8D and its output is connected to 10 buffer terminals through a BCD to decimal decoder 158.

Other terminals in FIG. 7 include an external recenter terminal 160 labelled terminal No. 5 which is connected through gates Q5C, Q5B, and Q5D to a recenter bus 162. Terminal 160 is for use with a push-button to provide an external recenter of the system by manual depression of the push-button. A capacitor 164 and resistor 166 provide for power turn on recentering when the system is initially connected to a power supply and for this purpose they are connected to the recenter bus 162 through gate Q5D. A lack of clock signal sensing circuit is generally indicated at 168 and this is connected through an inverter 170 (Q10D) and through gate Q5A to the recentering bus 162 by way of the circuitry previously described. Essentially the lack of clock sensing circuit 168 involves a pair of capacitors 172 and 174 which are kept charged by the clock signal and are connected to OR gate Q10A. Also connected to the recenter bus 162 is a terminal 176 labelled terminal No. 8 which is an overflow bus adapted to be connected to the buffer circuit. It receives a signal when the capacity of the elastic buffer has been exceeded to indicate that no additional boards, i.e., no additional capacity, is available. In such case, the system recenters to the midpoint on the digital delay line in which case a small segment of the data is lost and has to be retransmitted. Finally, the recenter bus 162 is connected by a lead 178 to the reset pins No. 9 of the up/down counters and to an additional line driver 180 coupled to recenter pulse output terminal 182 labelled terminal No. 6. This provides a recenter pulse source output which may be used to reset related equipment used with the data synchronizer 10 which, for example, might include a data encrypting circuit.

The importance of flip-flop 96 will now be explained. When the buffer is decreasing the delay an error may occur when the elastic buffer steps back one bit (each time it steps back one bit).

This is not a problem in systems where the phase correction is made during the framing time slot as no data occurs at this time. This, however, makes such a system dependent on time being available in the data stream in order to make phase corrections without making errors.

This invention does not require a special time slot as another means to prevent the error is employed, therefore, no constraints are applied to the data stream and it will work with any data stream.

This is the problem:

When delay is being reduced the phaser shift register and data selector combinations (which makes ¼ bit corrections) is moving "backward" from the fourth ¼ bit position to the first ¼ bit position.

The next correction after it reaches the first ¼ bit position is the main buffer moves back by 1 bit and the phaser moves to the fourth ¼ bit position. However, the data bit in the phaser shift register/data selector at that time is still propagating thru the shifter register and will be taken at the output twice, once at the first ¼ bit position and again at the fourth ¼ bit position.

Therefore, one of the data bits will be sampled and outputted twice causing an error.

This is why previous systems have made phase corrections during the framing time slot when no valid data is present.

This problem is solved in this invention by storing the bit on the phaser shift register/data selector first ¼ bit position at the time the data selector moves from the first ¼ bit position to the fourth ¼ bit position such that the next data bit outputted after the switch from the first ¼ bit position to the fourth ¼ bit position is the stored data from the first ¼ bit position rather than the data on the fourth ¼ bit position. On the following data bit the correct data has been propagated into the phaser shift register and the output data is then taken from the fourth ¼ bit position.

To summarize, when the data phaser is moving in the "down" or decreasing direction one extra data bit is taken from the first ¼ bit position after the switch from the first to the fourth ¼ bit position by means of storing the data bit on the first position. On the next data bit the phaser shift register has valid data and the data is then taken from the fourth ¼ bit position.

This is accomplished by toggling a flip-flop (FIG. 4 #96) each time a phase correction occurs caused by the phase detector 76. The connection from flip-flop 96 to data selector 98 causes the data selector output to go to its third or high impedance state. The output of the data selector 98 goes by line 140 to pin 5 of the flip-flop 142 of FIG. 7b through a 100k resistor R8.

The data is stored on the input capacitance of pin 5 of flip-flop 142. Resistor R8 (100k) and the input capacitance (5pf) at pin 5 of flip-flop (142) form an RC delay of approximately ½ microsecond. This allows the data selector (98 FIG. 4) a little time to go to its high impedance state.

By this means, the data output of the data selector 98 when the data selector was selecting the first bit of shift register 102 is stored at the time the data selector switches to the last bit of shift register 102.

The first positive going transition of the local clock which is applied to pin 3 of flip-flop 142 (FIG. 7b) then transfers the stored data bit on pin 5 of the same flip-flop to its output on pin 1 and hence to the data output line driver 146. This same local clock positive transition resets flip-flop 96 (FIG. 4) removing data selector 98 from its high impedance state to its normal state. Data selector 98 at this time is selecting the last bit of shift register 102 such that the next local clock positive transition will clock out the data from the last bit of shift register 102. However, at this time the next data bit has been propagated thru shift register 102 and valid data appears at its last bit position.

In reality the entire process of storing the last bit of data at the output of data selector 98 occurs each time a ¼ bit correction occurs in both the increasing and decreasing delay conditions.

This means that it also occurs when it is not needed but this does not interfere with normal operation or cause errors. The point here is it does occur when needed.

This is a general solution to this particular problem and permits use of the system with any data stream.

FIGS. 8a through 8e when arranged in the manner illustrated in FIG. 8 constitute a detailed logic diagram in CMOS for the elastic buffer 22 of the present invention. The elastic buffer is used with the phaser of FIGS. 7a to 7h to form the complete automatic data synchronizer 10. In FIG. 8, the remote clock after the signals have been squared and smoothed are applied to the clock input terminal 184 labelled S. These come from the correspondingly labelled terminal 186 of FIG. 7. The clock signals are applied to pins 1 and 9 of the shift registers of which there are shown by way of example only in FIG. 8 a total of eight number 4015 integrated circuits labelled Q7, Q11, Q15, Q19, Q10, Q14, Q18 and Q22, respectively. These are connected to the corresponding integrated circuits Q8, Q12, Q16, Q20, Q9, Q13, Q17 and Q21, respectively, which form the master data selector or master switch 44. Because of the number, the switches are connected in a hierarchy through the common selector switch 190 (Q5) to the data output lead 192. This connects to the data output terminal 194 labelled M in turn connected to the similarly labelled terminal 196 in FIG. 7. Of course, when the elastic buffer 22 of FIG. 8 is used the incoming data is applied directly to the buffer and connects to input terminal 198 where it passes through transmission gate 200 before being applied to the shift register 42.

The elastic buffer 22 is formed of integrated circuits comprising two shift registers Q19 and Q10 and the corresponding selector switches Q20 and Q9. A second portion of the buffer comprises the shift registers Q15 and Q14 and the selector switches Q16 and Q13. Third and fourth portions are formed by shift registers Q11 and Q18 and the selector switches Q12 and Q17, as well as the shift registers Q7 and Q22 at each end as shown in the drawing and the corresponding selector switches Q8 and Q21. These are on circuit boards and there are eight shift registers and data selectors per board in two groups of four with the output of the first group and the input to the second group brought out to the edge connector. By external wiring as additional boards are added, half the buffer storage is added to the input side of the preceding buffers and the other half to the output side of the preceding buffers.

It can be seen that the capacity of the elastic buffer can be increased as desired by adding additional boards, half of the capacity being added at one end and half at the other end to preserve symmetry with the system being centered about the final output from the last stage of shift register Q19 which forms a center of the elastic buffer. That is, the digital delay line formed by the shift registers is initially set or centered when the data is delayed by an amount equal to one-half the capacity of the delay line so that the delay may be increased or decreased by an equal amount within the capacity of the digital delay line or elastic buffer. The selection of the one of the eight shift registers, data selector combinations for operation is made by the selector switch 190 based upon the information from the up/down counters 148 and 90 of FIG. 7 as appearing on the four leads 202, 204, 206 and 208. Status information from these leads as well as from the first up/down counter 90 by way of terminal K is applied to the logic circuit 210 to perform the various logic functions indicated through the exclusive OR gates 212, the logic gates shown, and the transmission gates 214, 216 and 218. These comprise NOR gate 220, OR gates 222, 224 and 226, and AND gates 228, 230, 232 and 234.

It is apparent from the above that the present invention provides an improved device for synchronizing incoming data with a local clock. The system operates by comparing the local clock with an incoming clock signal and delaying the incoming clock so that the two are in synchronism. The incoming data is delayed the same amount as the incoming clock so that in this manner the data as read out of the device is also synchronized with the local clock. The unit combines a phaser which is used to provide synchronism of up to one bit whereas multi-bit phase correction is obtained by combining the phaser with an elastic buffer.

If desired, a display can be connected to the up/down counter to show the status of the automatic data synchronizer. This display not only indicates the number of bits of data stored, but more significantly it indicates the long term average error between send and receive clocks. In the case of satellite circuits, the difference between readings taken 24 hours apart indicates clock errors.

The system provides a means of disciplining all the clock oscillators within a communications system to thereby eliminate the need for super-accuracy as has been required in the past. Absolute clock accuracy is not required to operate a communications system in accordance with the present invention but only a common clock at all locations is required. The synchronizer provides a way of adjusting long term average clocks at any location within the communication system with the synchronizer compensating for short term clock errors and propagation delay phase errors. With the present invention it is possible to operate a communications system over a conventional communication cycle such as, for example, eight hours without any error or need for resynchronizing. Corrections are made through the variable digital delay and resynchronization may be effected without loss of data at the end of a conventional work duty cycle such as an 8 hour period of transmission. In this way it is not necessary to have shut-downs or loss of data during the normal transmission period.

The invention may be embodied in other specific forms without departing from the spirit or essential characteristics thereof. The present embodiments is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by U.S. Letters Patent is:

1. An automatic data synchronizer comprising first and second inputs for receiving clock and data pulses from a remote location, a local clock input and a data output, a first variable digital delay line coupling said data input to said data output, a second variable digital delay line coupled to said clock pulse input, a phase comparator coupled to the output of said second variable digital delay line and to said local clock input, said comparator supplying a control signal to said second variable delay line for adjusting the delay of said second delay line when the phase difference between signals applied to said local clock input and the output of said second variable delay line exceeds a predetermined amount, said adjustment being in such a direction as to keep said phase difference within said predetermined amount, and means coupled to said comparator for adjusting the setting of said first variable digital delay line in accordance with the setting of said second variable delay line whereby clock and data signals from a remote location applied to said first and second inputs are delayed a like amount by said first and second delay lines.

2. A synchronizer according to claim 1 wherein said delay lines include means for varying their delays by fractions of a clock bit period.

3. An automatic data synchronizer comprising first and second inputs for receiving clock and data pulses from a remote location, a local clock input and a data input, a first variable digital delay line coupling said data input to said data output, a second variable digital delay line coupled to said clock pulse input, a phase comparator coupled to the output of said second variable digital delay line and to said local clock input, said comparator supplying a control signal to said second variable delay line for adjusting the delay of said second delay line when the phase difference between signals applied to said local clock input and the output of said second variable delay line exceeds a predetermined amount, said adjustment being in such a direction as to keep said phase difference within said predetermined amount, means coupled to said comparator for adjusting the setting of said first variable digital delay line in accordance with the setting of said second variable delay line whereby clock and data signals from a remote location applied to said first and second inputs are delayed a like amount by said first and second delay lines, said delay lines including means for varying their delays by fractions of a clock bit period, and storage means coupling said comparator to said first variable delay line whereby the delay of said first delay line may be increased or decreased at any time in a bit stream without introducing a data error.

4. A synchronizer according to claim 3 wherein said delay lines comprise shift registers.

5. A synchronizer according to claim 3 including a master variable delay line coupled to said second delay line for delaying data by more than one whole clock bit period.

6. A synchronizer according to claim 5 wherein said master variable delay line comprises a shift register.

7. A synchronizer according to claim 6 wherein said master shift register is of modular construction whereby its delay capacity may be increased by adding modules.

8. A synchronizer according to claim 7 wherein said master shift register is initially centered with equal delay capacity on each side so that the data delay may be increased or reduced in said master shift register by an equal amount.

9. A synchronizer according to claim 6 including a master data selector coupling said master shift register to said second variable delay line, said master shift register comprising a plurality of parallel outputs for its respective stages, said master data selector comprising a solid state switch for coupling one of said parallel outputs to the input of said second variable delay line.

10. An automatic data synchronizer comprising first and second inputs for receiving clock and data pulses from a remote location, a local clock input and a data output, a first shift register forming a variable digital delay line, means coupling said clock pulse input to the input of said first shift register whereby clock pulses from a remote location are applied to said first shift register, a pulse frequency multiplier coupling said clock pulse input to said first shift register for shifting pulses along said register at a rate corresponding to the output of said multiplier whereby successive stages of said first shift register contain said clock pulses delayed by successive fractions of a clock bit period, said first shift register having parallel outputs for its respective stages, a phase comparator having one input coupled to said local clock input, a data selector coupling one of said first register parallel outputs to the other input of said phase comparator, an up/down counter coupling said comparator to said data selector for actuating said data selector in accordance with the output of said comparator, a second shift register forming a variable digital delay line coupling said data input to said data output, and means coupled to said comparator for varying the delay of said second shift register in accordance with the output of said comparator at any time in a bit stream without introducing a counting error.

11. An automatic data synchronizer comprising first and second inputs for receiving clock and data pulses from a remote location, a local clock input and a data output, a first shift register forming a variable digital delay line, means coupling said clock pulse input to the input of said first shift register whereby clock pulses from a remote location are applied to said first shift register, a pulse frequency multiplier coupling said clock pulse input to said first shift register for shifting pulses along said register at a rate corresponding to the output of said multiplier whereby successive stages of said first shift register contain said clock pulses delayed by successive fractions of a clock bit period, said first shift register having parallel outputs for its respective stages, a phase comparator having one input coupled to said local clock input, a data selector coupling one of said first register parallel outputs to the other input of said phase comparator, an up/down counter coupling said comparator to said data selector for actuating said data selector in accordance with the output of said comparator, a second shift register forming a variable digital delay line coupling said data input to said data output, means coupled to said comparator for varying the delay of said second shift register in accordance with the output of said comparator at any time in a bit stream without introducing a counting error, said second shift register comprising a plurality of stages containing data pulses delayed by the same successive fractions of a clock bit period as the stages of said first shift register, said second shift register having parallel outputs for its respective stages, and a second data selector coupling one of said second register parallel outputs to said data output.

12. A synchronizer according to claim 11 wherein said pulse frequency multiplier comprises a phase locked loop.

13. A synchronizer according to claim 12 wherein said data select control unit comprises an up/down counter.

14. A synchronizer according to claim 13 wherein said data selectors comprise ganged solid state switches for selecting corresponding parallel outputs of said respective first and second registers whereby the data pulses in said second register are delayed by the same amount as the clock pulses in said first register.

15. A synchronizer according to claim 14 including a master shift register coupling said data input to said second shift register.

16. A synchronizer according to claim 15 wherein said master shift register includes a plurality of stages containing data pulses delayed by successive whole clock bit periods, said master shift register having parallel outputs for its respective stages, and a master data selector coupling one of said master register parallel outputs to the input of said second shift register.

17. A synchronizer according to claim 16 including a master data control unit coupling said phase comparator to said master data selector whereby said master data selector is actuated once for each cycle of actuation of said first and second shift register data selectors.

18. A synchronizer according to claim 17 wherein said second local clock input and said data output are interconnected by a regenerator to remove distortion from the delayed data pulses.

19. A synchronizer according to claim 18 wherein said regenerator is formed by a D-type flip-flop.

20. A synchronizer according to claim 12 wherein said phase lock loop multiplies said clock pulses by four.

* * * * *